(12) United States Patent
Horn et al.

(10) Patent No.: US 11,405,841 B2
(45) Date of Patent: Aug. 2, 2022

(54) USING UE ENVIRONMENTAL STATUS INFORMATION TO IMPROVE MOBILITY HANDLING AND OFFLOAD DECISIONS

(71) Applicant: QUALCOMM Incorporated, San Diego, CA (US)

(72) Inventors: Gavin Bernard Horn, La Jolla, CA (US); Peter Gaal, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 13/939,869

(22) Filed: Jul. 11, 2013

(65) Prior Publication Data

US 2015/0016412 A1    Jan. 15, 2015

Related U.S. Application Data

(60) Provisional application No. 61/674,220, filed on Jul. 20, 2012.

(51) Int. Cl.
*H04W 36/24*      (2009.01)
*H04W 68/04*      (2009.01)
(Continued)

(52) U.S. Cl.
CPC ........... *H04W 36/24* (2013.01); *H04W 68/04* (2013.01); *H04W 36/0058* (2018.08); *H04W 76/28* (2018.02)

(58) Field of Classification Search
CPC .... H04W 28/08; H04W 36/165; H04W 4/008
(Continued)

(56) References Cited

U.S. PATENT DOCUMENTS

| 6,614,769 B1 | 9/2003 | Erlick et al. |
| 7,171,215 B2 | 1/2007 | Khouaja et al. |

(Continued)

FOREIGN PATENT DOCUMENTS

| DE | 102007016540 A1 | 10/2008 |
| EP | 1580687 A1 | 9/2005 |

(Continued)

OTHER PUBLICATIONS

Bittermann, Jorg, Written Opinion of the International Searching Authority for PCT/US2013/050304; dated May 12, 2013; EPO.*

(Continued)

*Primary Examiner* — Gary Mui
*Assistant Examiner* — Chuong M Nguyen
(74) *Attorney, Agent, or Firm* — Norton Rose Fullbright US LLP

(57) ABSTRACT

User equipment (UE) connection handling is disclosed in which UE environmental status information is used at a network entity to make informed decisions regarding mobility handling and data offloading. A UE determines its environmental status information based on input from at least one non-RF sensor located in the UE. The UE generates and then transmits a control message comprising the UE environmental status information to a network entity in communication with the UE. The network entity receives the control message and uses the UE environmental status information to manage a connection of the associated UE based at least in part on the UE environmental status information.

66 Claims, 9 Drawing Sheets

(51) Int. Cl.
*H04W 76/28* (2018.01)
*H04W 36/00* (2009.01)

(58) Field of Classification Search
USPC ........ 370/229, 328, 331; 455/41.2, 437, 525
See application file for complete search history.

(56) References Cited

U.S. PATENT DOCUMENTS

| | | | |
|---|---|---|---|
| 8,284,722 B2 | 10/2012 | Park et al. | |
| 2004/0002349 A1* | 1/2004 | Yamagishi | H04W 88/02 |
| | | | 455/66.1 |
| 2004/0147264 A1* | 7/2004 | Ogawa | H04W 36/30 |
| | | | 455/436 |
| 2004/0230913 A1* | 11/2004 | Moribe | 715/778 |
| 2007/0104156 A1 | 5/2007 | Inoue et al. | |
| 2008/0219212 A1 | 9/2008 | Kim | |
| 2009/0005005 A1* | 1/2009 | Forstall | H04W 4/50 |
| | | | 455/411 |
| 2009/0227271 A1 | 9/2009 | Lee | |
| 2010/0113036 A1 | 5/2010 | Cho et al. | |
| 2010/0273485 A1* | 10/2010 | Huang | H04W 36/34 |
| | | | 455/435.3 |
| 2010/0323657 A1* | 12/2010 | Barnard | H04M 1/663 |
| | | | 455/404.1 |
| 2011/0035059 A1 | 2/2011 | Ersavas | |
| 2011/0207449 A1* | 8/2011 | Shin | H04M 1/72577 |
| | | | 455/419 |
| 2011/0273378 A1* | 11/2011 | Alameh | H04M 1/72454 |
| | | | 345/173 |
| 2012/0002608 A1* | 1/2012 | Vesterinen | H04W 8/082 |
| | | | 370/328 |
| 2012/0122515 A1* | 5/2012 | Han | H04W 48/20 |
| | | | 455/507 |
| 2012/0129517 A1* | 5/2012 | Fox | H04W 4/60 |
| | | | 455/425 |
| 2012/0178454 A1 | 7/2012 | Kim et al. | |
| 2012/0244903 A1* | 9/2012 | Fong | H04L 43/16 |
| | | | 455/517 |
| 2013/0100895 A1* | 4/2013 | Aghili | H04W 4/00 |
| | | | 370/329 |
| 2014/0016614 A1* | 1/2014 | Velev | H04W 76/27 |
| | | | 370/331 |
| 2014/0019743 A1* | 1/2014 | DeLuca | G06F 1/3206 |
| | | | 713/100 |
| 2014/0029513 A1* | 1/2014 | Takahashi | H04W 12/03 |
| | | | 370/328 |
| 2014/0148169 A1* | 5/2014 | Li et al. | 455/437 |
| 2014/0335791 A1* | 11/2014 | Kim | H04W 4/008 |
| | | | 455/41.2 |
| 2015/0024775 A1* | 1/2015 | Jung | H04W 64/003 |
| | | | 455/456.1 |
| 2015/0215895 A1* | 7/2015 | Iwai | H04W 68/04 |
| | | | 455/458 |
| 2015/0271868 A1* | 9/2015 | Rune | H04W 24/10 |
| | | | 370/311 |

FOREIGN PATENT DOCUMENTS

| | | |
|---|---|---|
| JP | 2006005597 A | 1/2006 |
| JP | 2006211335 A | 8/2006 |
| JP | 2010172044 A | 8/2010 |
| JP | 2011503961 A | 1/2011 |
| KR | 20090085640 A | 8/2009 |
| KR | 20120052122 A | 5/2012 |
| WO | WO-2004114703 A1 | 12/2004 |
| WO | WO-2006137779 A1 | 12/2006 |
| WO | WO-2009058070 A1 | 5/2009 |
| WO | WO-2011072747 A1 | 6/2011 |
| WO | WO-2012166969 A1 | 12/2012 |
| WO | WO-2012166975 A1 | 12/2012 |

OTHER PUBLICATIONS

International Search Report and Written Opinion—PCT/US2013/050304—ISA/EPO—dated Dec. 5, 2013.

* cited by examiner

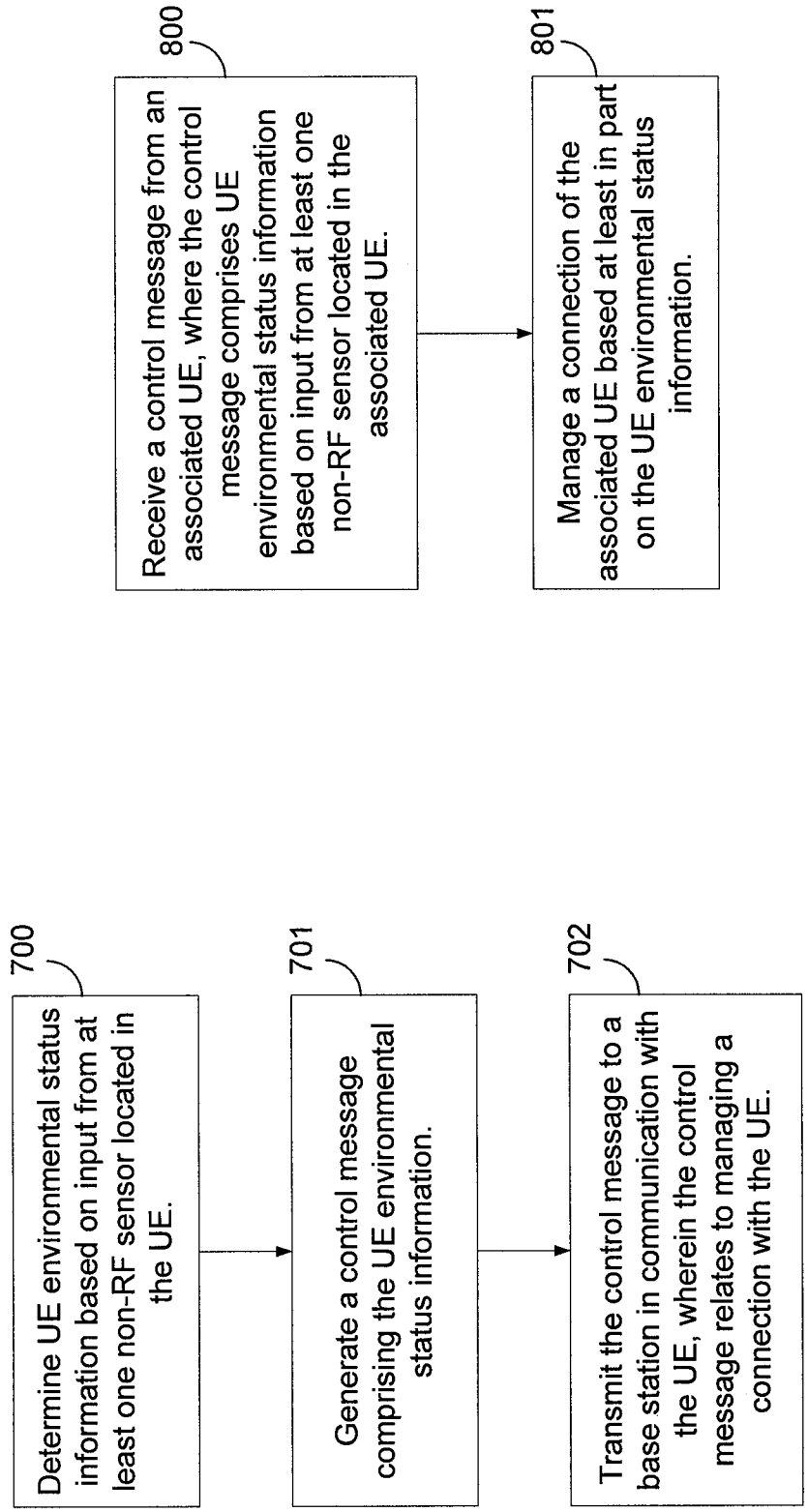

USING UE ENVIRONMENTAL STATUS INFORMATION TO IMPROVE MOBILITY HANDLING AND OFFLOAD DECISIONS

CROSS-REFERENCE TO RELATED APPLICATIONS

This application claims the benefit of U.S. Provisional Patent Application No. 61/674,220, entitled, "USING UE ENVIRONMENTAL STATUS INFORMATION TO IMPROVE MOBILITY HANDLING AND OFFLOAD DECISIONS", filed on Jul. 20, 2012, which is expressly incorporated by reference herein in its entirety.

BACKGROUND

Field

Aspects of the present disclosure relate generally to wireless communication systems, and more particularly, to using user equipment (UE) environmental status information to improve mobility handling and offload decisions.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, by a UE, UE environmental status information based on input from at least one non-RF sensor located in the UE. The method further includes generating a control message comprising the UE environmental status information and transmitting the control message to a base station in communication with the UE, wherein the control message relates to managing a connection with the UE by an associated wireless communication network.

In an additional aspect of the disclosure, a method of wireless communication includes receiving, by a network entity, a control message from an associated UE, wherein the control message comprises UE environmental status information based on input from at least one non-RF sensor located in an associated UE. The method further includes managing a connection of the associated UE based at least in part on the UE environmental status information.

In an additional aspect of the disclosure, a system of wireless communication that includes means for determining, by a UE, UE environmental status information based on input from at least one non-RF sensor located in the UE, means for generating a control message comprising the UE environmental status information, and means for transmitting the control message to a base station in communication with the UE, wherein the control message relates to managing a connection with the UE by an associated wireless communication network.

In an additional aspect of the disclosure, a system of wireless communication that includes means for receiving, by a network entity, a control message from an associated UE, wherein the control message comprises UE environmental status information based on input from at least one non-RF sensor located in an associated UE and means for managing a connection of the associated UE based at least in part on the UE environmental status information.

In an additional aspect of the disclosure, a computer program product has a computer-readable medium having program code recorded thereon. This program code includes code to determine, by a UE, UE environmental status information based on input from at least one non-RF sensor located in the UE, code to generate a control message comprising the UE environmental status information, and code to transmit the control message to a base station in communication with the UE, wherein the control message relates to managing a connection with the UE by an associated wireless communication network.

In an additional aspect of the disclosure, a computer program product has a computer-readable medium having program code recorded thereon. This program code includes code to receive, by a network entity, a control message from an associated UE, wherein the control message comprises UE environmental status information based on input from at least one non-RF sensor located in an associated UE and code to manage a connection of the associated UE based at least in part on the UE environmental status information.

In an additional aspect of the disclosure, an apparatus includes at least one processor and a memory coupled to the processor. The processor is configured to determine, by a UE, UE environmental status information based on input from at least one non-RF sensor located in the UE, to generate a control message comprising the UE environmental status information, and to transmit the control message to a base station in communication with the UE, wherein the control message relates to managing a connection with the UE by an associated wireless communication network.

In an additional aspect of the disclosure, an apparatus includes at least one processor and a memory coupled to the processor. The processor is configured to receive, by a network entity, a control message from an associated UE, wherein the control message comprises UE environmental status information based on input from at least one non-RF sensor located in an associated UE and to manage a connection of the associated UE based at least in part on the UE environmental status information.

BRIEF DESCRIPTION OF THE DRAWINGS

FIG. 7 is a diagram illustrating example blocks executed to implement one aspect of the present disclosure.

FIG. 8 is a diagram illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
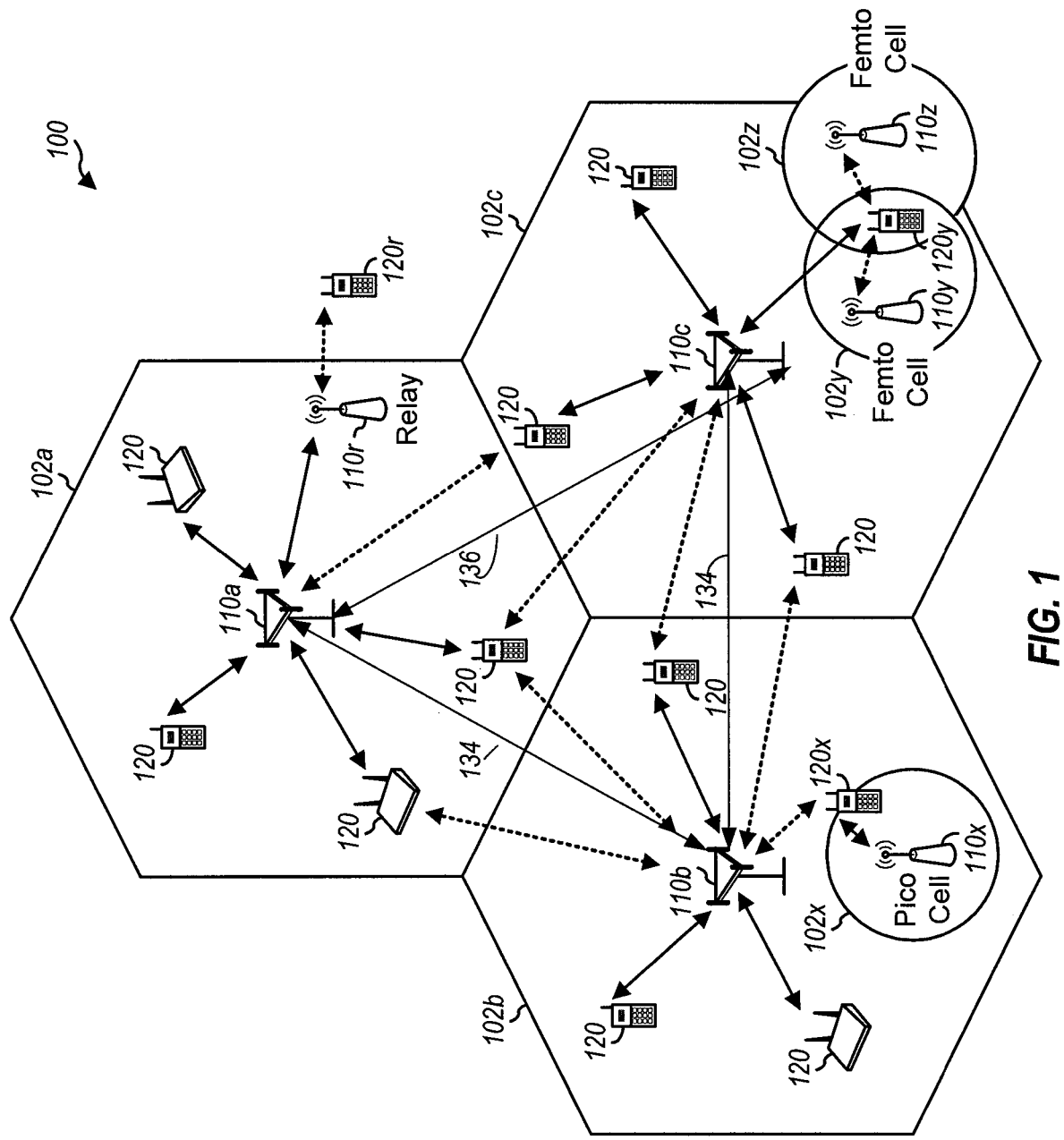
FIG. 1 is a block diagram illustrating an example of a mobile communication system.

FIG. 1 shows a wireless network 100 for communication, which may be an LTE-A network. The wireless network 100 includes a number of evolved nodeBs (eNBs) 110 and other network entities. An eNB may be a station that communicates with the UEs and may also be referred to as a base station, a nodeB, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like. As used herein, the term "small cell" may refer variously to femto cells, pico cells, relay stations, and like elements forming part of the wireless network 100 air interface.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a smartphone, a tablet computer, a laptop, a wireless modem, a wireless communication device, a handheld device, a cordless phone, a wireless local loop (WLL) station, or the like. UEs 120 may include a variety of sensors capable of ascertaining information about their respective operating environments. For instance, a smartphone may include a microphone, a camera, a position location capability (such as GPS), an accelerometer, an altimeter, a photo-sensor, a thermometer, a gyroscope, a heart rate monitor, a humidity detector, a charging indicator, a barometer, and like elements that may be separate from the receiver used for radio communication with a serving base station. Collectively, these sensors may be referred to as "non-RF sensors."

UEs 120 may also include an application processor configured to support various user and system level applications, as well as memory and non-volatile storage elements for retaining data and program instructions. For instance, an advanced UE may include a processor coupled with the various non-RF sensors and configured with mapping, calendar, and visual recognition applications. As described hereinafter, the UE may combine information obtained from the various sensors with application data to determine an operating context. The operating context may also be referred to as an "environmental status" and may include an estimated duration over which it is expected to be valid. Information that is derived from the non-RF sensors and applications may be broadly referred to as "environmental status information" (ESI).

A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Advantageously, wireless network 100 supports connection management based on environmental status information. In one aspect, UEs 120 provide ESI in one or more control messages and wireless network 100 manages their respective connections based at least in part on the ESI. UEs 120 may provide ESI during connection establishment by, for example, transmitting one or more radio resource configuration (RRC) messages. Connection management may be performed by elements of the core network (CN) such as a mobility management entity (MME), or by elements of the radio access network (RAN) such as eNBs 110, 120, or by both. The CN may utilize the ESI to optimize a paging area, to make decisions about offloading UE data traffic, and/or to determine an optimal network policy for a particular UE. Likewise, the RAN can perform connection management by using ESI to establish a UE-specific handover preference between the small cell layer and the macro layer in a heterogeneous environment, to activate booster cells for Wi-Fi offloading, and/or to control simultaneous communication with the macro and small cell layers using multi-flow techniques. In general, the present disclosure provides techniques by which sensor-based data from UEs is used in a wireless network for optimal connection management, including as a means to understand the causes of certain UE behaviors and to predict how long such behaviors are likely to last.

Figure 2:
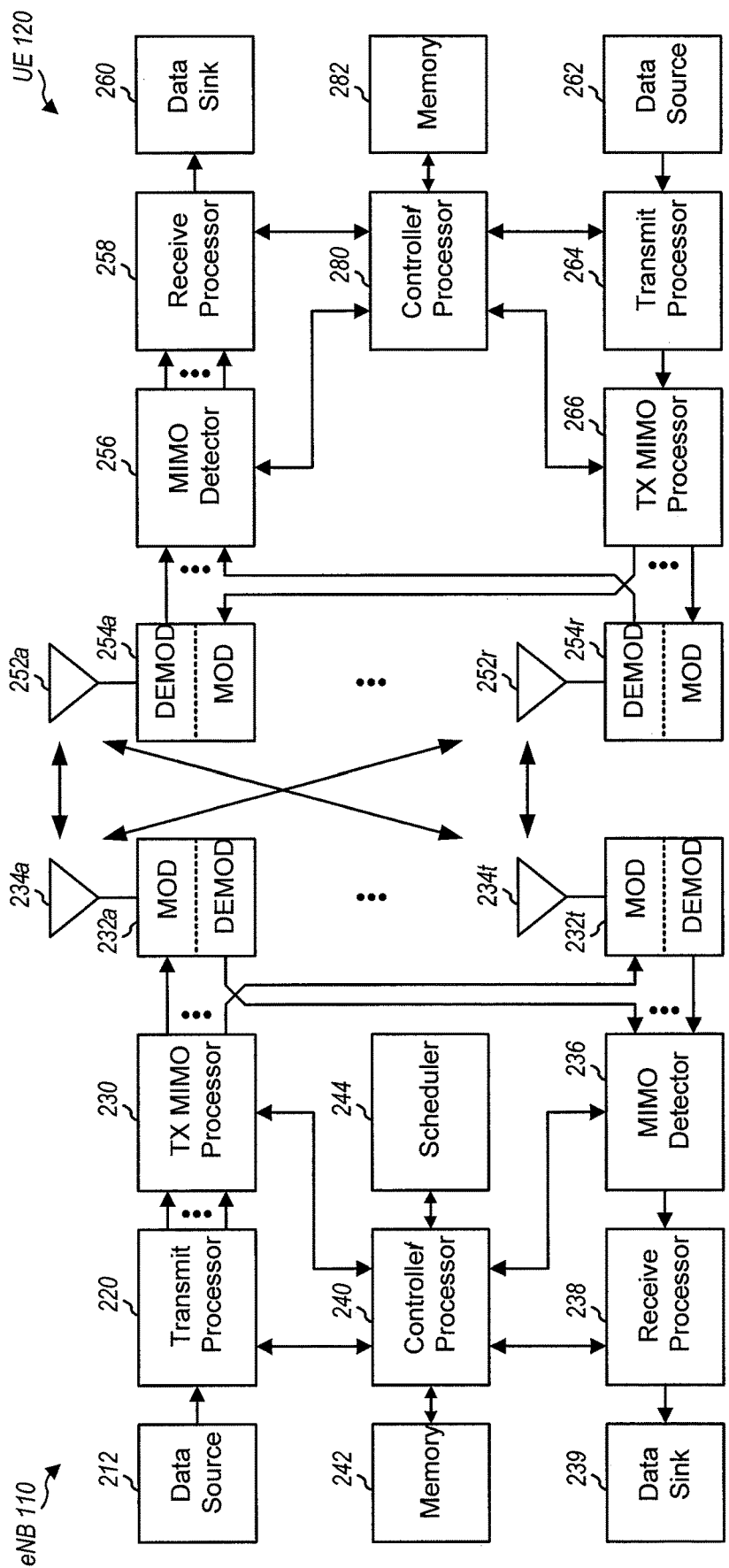
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 7 and 8, and/or other processes for the techniques described herein. The memories 242 and 282 may store data and program codes for the eNB 110 and the UE 120, respectively. A scheduler 244 may schedule UEs for data transmission on the downlink and/or uplink.

Wireless communication networks manage the connections of associated UEs using various radio frequency (RF) measurement information received from the UEs along with additional information maintained by network entities, such as location of the eNB or cell to which the UE is connected, number of handovers, and the like, to make decisions regarding the UEs connections. Mobility management functionality keeps track of the location of the UE for purposes of paging and transmitting data and voice calls addressed to the UE. The location is typically identified based on the location of the eNB or cell to which the UE is connected when location updates are made. Mobility of the UE may also be estimated at the radio access network (RAN) based on Doppler and the number of handovers the UE experienced in the connected mode.

As part of connection management, data traffic may be offloaded from the core network to a small cell network accessed through femto access points, pico access points, relays, and the like (referred to collectively as small cell access points). Thus, when the UE is known to be proximate to a small cell access point that may provide data traffic, the macro eNB may direct the UE to be handed over to the small cell access point, thus, balancing the communication load at the macro eNB. For example, data traffic may be offloaded from the macro eNB using local internet protocol (IP) access (LIPA). LIPA provides access for IP capable user devices to connect through an access point (e.g., using access point radio access) to other IP capable entities in the same residential/enterprise IP network.

Traffic for LIPA is not expected to traverse a mobile operator's network. For example, LIPA can be provided by home access points (e.g., femto access points) using wireless wide area access technology (such as UMTS (Universal Mobile Telecommunications System, LTE (Long Term Evolution), HSPA (High-Speed Packet Access), HRPD (High Rate Packet Data), 1x, and so forth). With LIPA, a mobile station (access terminal, user equipment, mobile device, and so on depending on the technology) can connect to the locally available nodes in the home network (or other local network). The locally available nodes include a printer, media server, other computers, or other devices in the home/local network, through an access point. LIPA may also be extended for Internet access, allowing the macro eNB to offload such Internet connection traffic as well.

Another technique for offloading data traffic from the core network is selected IP traffic offload (SIPTO). SIPTO provides a gateway selection mechanism for routing selected IP traffic through the most optimal path in an operator's core network or bypassing the operator's core network completely. The gateway selection mechanism takes into account the location of the small cell or macro eNB where the UE is connected for the packet data network (PDN) connection/packet data protocol (PDP) context activation and selects a gateway that is geographically or topologically close to the small cell or macro eNB. Selected IP traffic may then be offloaded at the local gateway using external IP connectivity.

As another part of connection management, a UE's mobility may be used in designating a corresponding paging area. The network maintains the location of the paging area assigned to the UE in order to know where to page the UE when incoming data is available. Each time a UE enters a new paging area, the UE will register or re-register with the network to update its position. The size of the paging area affects both the paging and the frequency at which the UE will be required to register as it moves around. In a large paging area, the local network will keep paging the UE as long as it remains in the same area, while, because the area is large, the UE will not be required to register as often. In contrast, a small paging area will required the UE to register more often as it moves out of the smaller area, while the local network will only page the UE while the UE is located within the smaller paging area. Therefore, there is a tradeoff between registration frequency and paging area maintenance based on the size of the paging area assigned.

Management of the UE's connection for data offloading and paging and registration allows for a greater efficiency and capacity management for the mobile network. However, relying upon RF measurement data from the UE and known location information may inadequately characterize a UE's mobility status leading to an inefficient use of network resources. For example, a user traveling in a vehicle enters a location in which a small cell access point is available for data offloading. The vehicle stops at a traffic light, thus, appearing to the macro eNB that the UE is available for data traffic offloading to the small cell access point. The Doppler reading for the UE stopped at the traffic light may appear to the RAN that the UE is experiencing low mobility. Therefore, the UE is handed over to the small cell access point to begin data traffic on the small cell. When the handover is completed, the traffic signal changes and the vehicle begins traveling again. As the UE begins to exceed the range of the small cell access point, the connection will either be lost or the UE will have to be handed over again to the macro network potentially causing delay or interruption of the connection. In this example, without environmental status information, the macro eNB is not able to determine that the UE is actually traveling in a vehicle and, thus, should not be handed over for data offloading.

Figure 3:
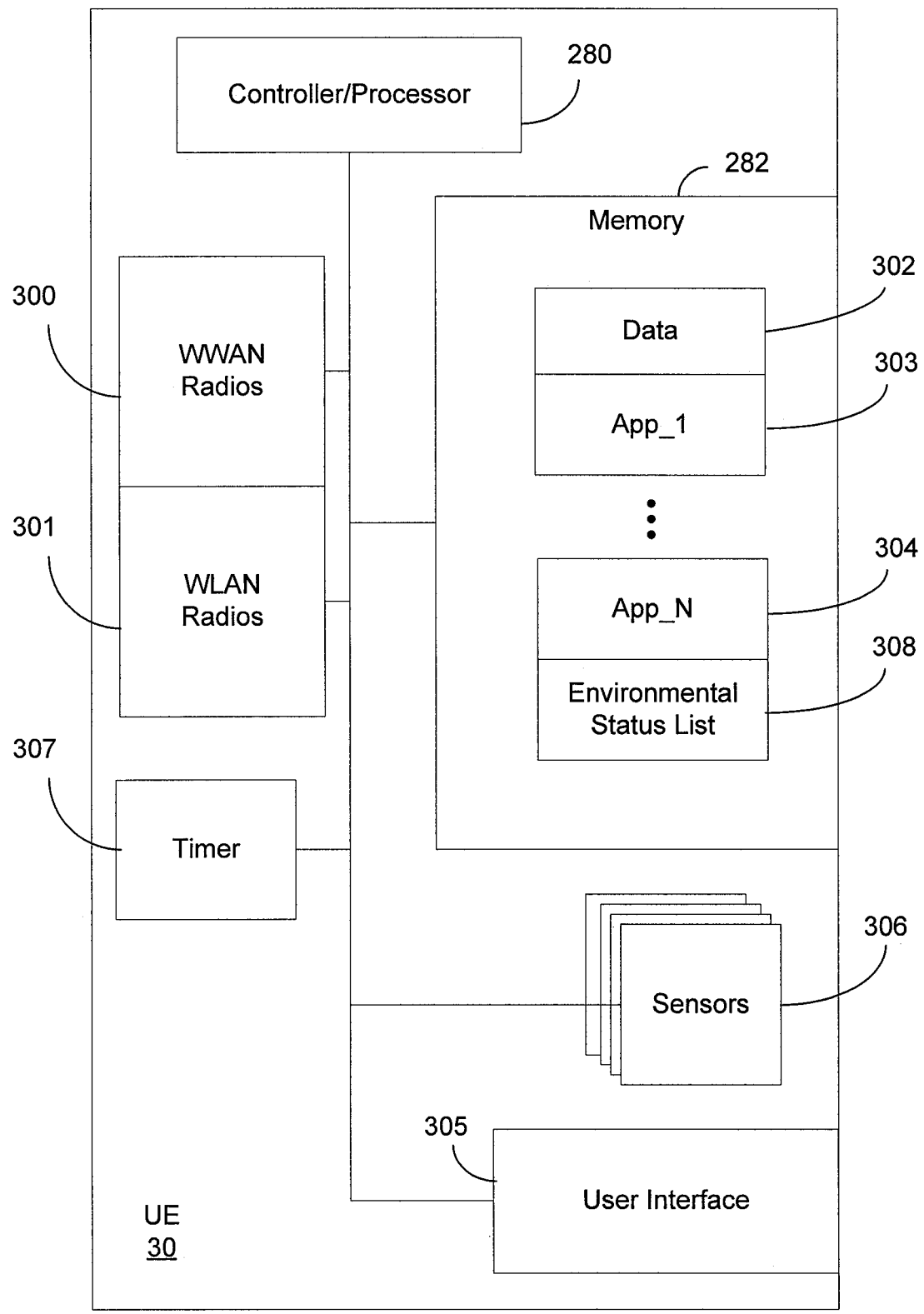
FIG. 3 is a block diagram illustrating a UE configured according to one aspect of the present disclosure.

FIG. 3 is a block diagram illustrating UE 30 configured according to one aspect of the present disclosure. UE 30 includes a controller/processor 280 and memory 282. Communication features are implemented using wireless wide area network (WWAN) radios 300 and wireless local area network (WLAN) radios 301 under control of controller/processor 280. WWAN radios 300 would generally facilitate communication over a long range wireless communication network such as 3G, 4G, LTE, and the like. WLAN radios 301, such as WIFI™ radios, BLUETOOTH® radios, and the like, would facilitate communication over a shorter range.

Data 302 and applications, App_1 303-App_N 304 are stored in memory 282 and available for execution and use by controller/processor 280. App_1 303-App_N 304 may be any number of various user applications operable by UE 30, including map applications, weather applications, social media applications, calendar applications, communication applications, and the like. The data 302 produced and used by applications, App_1 303-App_N 304, and used by UE 30 in general is also stored in memory 282 and accessible to the application and controller/processor 280.

User interface 305, under control of controller/processor 280, manages the input and output functionality of UE 30 by controlling the images and information displayed onto the display of UE 30 (not shown) and by controlling the input mechanisms for receiving user input, such as a touch screen, buttons, or the like.

UE 30 also includes sensors 306. The increase in technology for smartphones has allowed for the number and type of sensors available for smartphones, such as UE 30, to increase greatly. Sensors 306 include various combinations of non-radio frequency (RF) sensors, such as accelerometers, gyroscopes, global positioning system (GPS) receivers, thermometers, one or more cameras, one or more microphones, altimeters, heart rate monitors, humidity detectors, barometers, and the like. Under control of the controller/processor 280, sensors 306 detect states and actions or compile information which can be used to determine the environmental status of UE 30. The environmental status of UE 30 may indicate that UE 30 is outside or indoors, in a vehicle, in transit somewhere, at a work location, at home, and the like. The environmental status may also include such information as the amount of data traffic currently experienced and the UE state of UE 30. A UE state is the state or status of a particular UE and indicates a state, such as whether the display screen of the UE is on or off, if the UE is in a holster, in active use, in a pocket, connected to a charger, and the like. The UE environmental status information, therefore, provides more intelligent and detailed information about the status of the UE through the UE state information by utilizing the data or information compiled or output from sensors 306.

It should be noted that for purposes of this disclosure, the term non-RF sensors is used to mean any sensors that do not measure RF channel characteristics such as those that are used by a UE to provide measurement reports to a base station for connection management. Non-RF sensors may include sensors that detect displacement of component parts, such as accelerometers, gyroscopes, and the like, sensors that detect light or sounds waves, such as cameras, microphones, and the like, sensors that determine position, such as GPS and WIFI™ receivers, and the like, which receive GPS and WIFI™ signals and use those signals to determine position. While such receivers may receive or detect RF signals, for purposes of this disclosure, when used for any feature other than providing measurements of RF channel characteristics, such receivers may be considered non-RF sensors.

In consideration of the additional environmental status information that may be available with regard to UE 30 from non-RF sensors 306, applications 303-304, data elements 302, memory 282, and additional storage elements, various aspects of the present disclosure comprise UE 30 providing its UE environmental status information to the network, which can be then used to supplement the existing mobility information in order to better manage the connection. Such ESI may also include an estimated duration over which a particular status is likely to be maintained.

Figure 4:
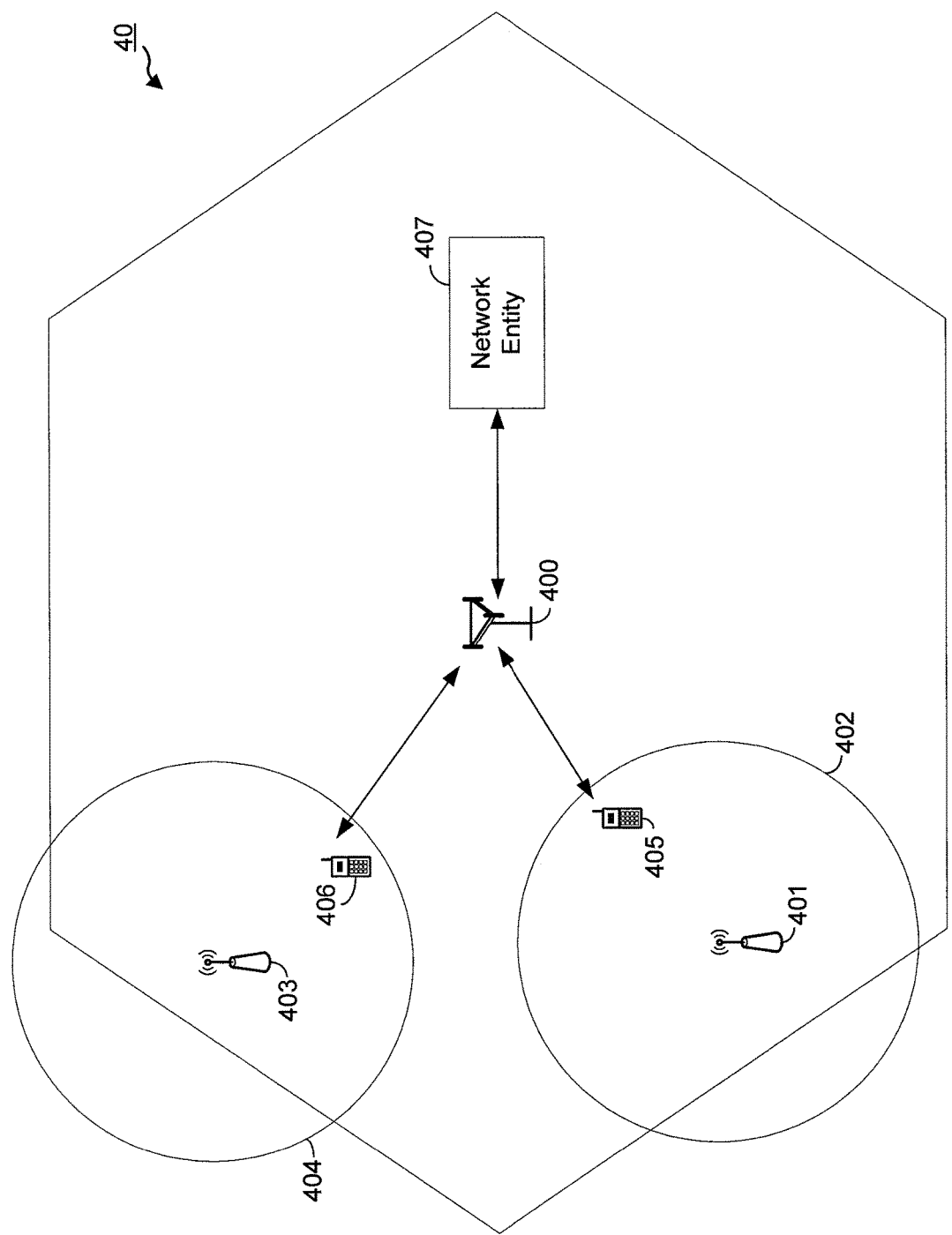
FIG. 4 is a block diagram illustrating a cell of a wireless communication network configured according to one aspect of the present disclosure.

FIG. 4 is a block diagram illustrating a cell 40 of a wireless communication network configured according to one aspect of the present disclosure. Cell 40 is serviced by a macro base station 400. Femto access points 401 and 403 provide small cell coverage areas 402 and 404, which may be suitable for offloading data traffic by macro base station 400. Macro base station 400 is coupled to a mobility management entity (MME) 407. MME 407 is a control node which processes signaling between the UE and the core network (CN) and provides visitor location register (VLR) functionality for the evolved packet system (EPS). It also supports functions related to bearer and connection management. MME 407 can also implement network policies for connection management such as policies associated with a particular user profile, subscription agreement, etc. In one aspect, MME 407 can select a network policy for connection management based at least in part on UE environmental status information. The following examples illustrate operation of the various entities in relation to environmental status information.

As shown, UEs 405 and 406 are located within cell 40 and are in communication with macro base station 400. In one example of operation, non-RF sensors within UE 405 detect movement of UE 405 at a velocity that exceeds the velocity at which a human can travel under its own power. UE 405 may calculate its velocity, for instance, by tracking changes in GPS position over time. Based on this detected information, UE 405 determines that it is currently located in a vehicle and designates its environmental status information as in a vehicle. When UE 405 first attempts connection with macro base station 400, it includes this environmental status information in a control message to macro base station 400. The control message may include one or more radio resource control (RRC) messages used for connection establishment. The vehicle that UE 405 is in stops at a traffic light located within small cell coverage area 402. However, unlike the previous example, when considering offloading data traffic of UE 405, macro base station 400 analyzes the Doppler reading, but also considers the UE environmental status information it received on connection establishment indicating that UE 405 is in a vehicle. Using this additional UE environmental status information, macro base station 400 determines that UE 405 is not a good candidate for data offloading to femto access point 401.

In additional aspects of the present disclosure, the data compiled or output from the non-RF sensors may be supplemented with application information resulting from one or more of the user applications, such as App_1 303-App_N 304 (FIG. 3). In another example, a user is walking outside with UE 406. Using only the Doppler reading and a rough location of UE 406, macro base station 400 might attempt to offload data traffic to femto access point 403 in small cell coverage area 404. However, in this example, femto access point 403 is located indoors and may not be able to connect to UE 406. UE 406 determines its environmental status information by analyzing sensor data. UE 406 accesses the camera on UE 406 (not shown) and attempts to use visual recognition software to detect the visual image. As with the previous example, UE 406 may calculate its velocity and determine it is moving at a velocity commensurate with a walking human. A thermometer sensor (not shown) may be accessed to determine the temperature where UE 406 is located. UE 406 may further access a weather application to determine the forecasted temperature for the location. Analyzing the camera image and comparing the measured temperature against the forecasted temperature, UE 406 may determine that it is located outside and is on a pedestrian walking.

In the present example, UE 406 determines its environmental status as being outdoors and transported by a pedestrian. When UE 406 attempts connection establishment with macro base station 400, it includes UE environmental status information in the RRC connection request message to macro base station 400. Macro base station 400 will then use the UE environmental status information when determining whether to attempt to offload the data traffic from UE 406 to femto access point 403. Because UE 406 is outdoors on a pedestrian, macro base station 400 will determine that UE 406 is not a good candidate for handover to femto access point 403.

In another example of using environmental status information for connection management, UE 405 is located at the user's workplace inside of an office building in which femto access point 401 is located. Prior to arriving in the building, UE 405 had already submitted its UE environmental status information to macro base station 400 in a non-access stratum (NAS) message wrapped in the RRC connection establishment messages. Macro base station 400 then forwarded the NAS message with the UE environmental status information to MME 407. The originally transmitted UE environmental status information for UE 405 indicated that it was in a vehicle traveling. Based on this status, MME 407 assigned a paging area that included multiple cells, including cell 40. Once UE 405 sent the original UE environmental status information, a time was initiated. This timer 307 (FIG. 3) identifies the life of the status information. When the timer expires without UE 405 having changed its UE environmental status information, the old status will be identified as stale and a new status determined and transmitted to the serving base station for updating.

While situated at work, the timer of UE 405 expires. In response to the timer expiring, UE 405 begins to determine a new environmental status. The non-RF sensors detect a temperature that corresponds to a room temperature and that does not match the forecasted temperature from the weather application on UE 405, the image data captured from the camera sensor is recognized as being indoors, and the GPS sensor data corresponds to a map entry, from the map application on UE 405, as being an office building that itself corresponds to the address for "Work" entered in the address book of UE 405. Using this non-RF sensor and application information, UE 405 determines its environmental status is indoors at work. UE 405 then transmits the updated UE environmental status information in a NAS message wrapped in an RRC message to macro base station 400. Macro base station 400 forwards the NAS message to MME 407. MME 407 receives the new UE environmental status information and assigns a new paging area. Because UE 405 is indoors at work, MME 407 assigns a narrow paging area of only small cell coverage area 402. Even with a small paging area, UE 405 is not expected to re-register too often as the likelihood is that UE 405 will remain within small cell coverage area 402 for an extended period of time.

It should be noted that the UE environmental status information can be provided to the network at the time the UE establishes a connection either to register (tracking area update (TAU)/routing area update (RAU)/location area update (LAU) and attach) or to connect for data services (service request). In addition, the UE environmental status information can also be provided when it changes assuming some hysteresis or threshold period. Also, UE environmental status information may be expressed in terms of one or more predetermined profiles in relation to which corresponding identifiers can be reported to the network.

It should further be noted, as illustrated above, that the UE environmental status information can be provided either in a NAS message to the MME or an RRC message to the eNB when the UE establishes a connection. Delivery of the UE environmental status information through a NAS message enables the CN to optimize the paging area for the UE, and determine whether to activate the data offload procedures, such as SIPTO and LIPA based on the UE environmental status information. Delivery of the UE environmental status information through an RRC message enables the RAN to optimize connected state mobility procedures for the UE based on the UE environmental status information. For example, via management of the handover of the UE to the macro or small cell layer and activation of booster cells for WIFI™ offloading, or the UE communicating simultaneously with the macro and small cell layer in a multi-flow configuration.

Figure 5:
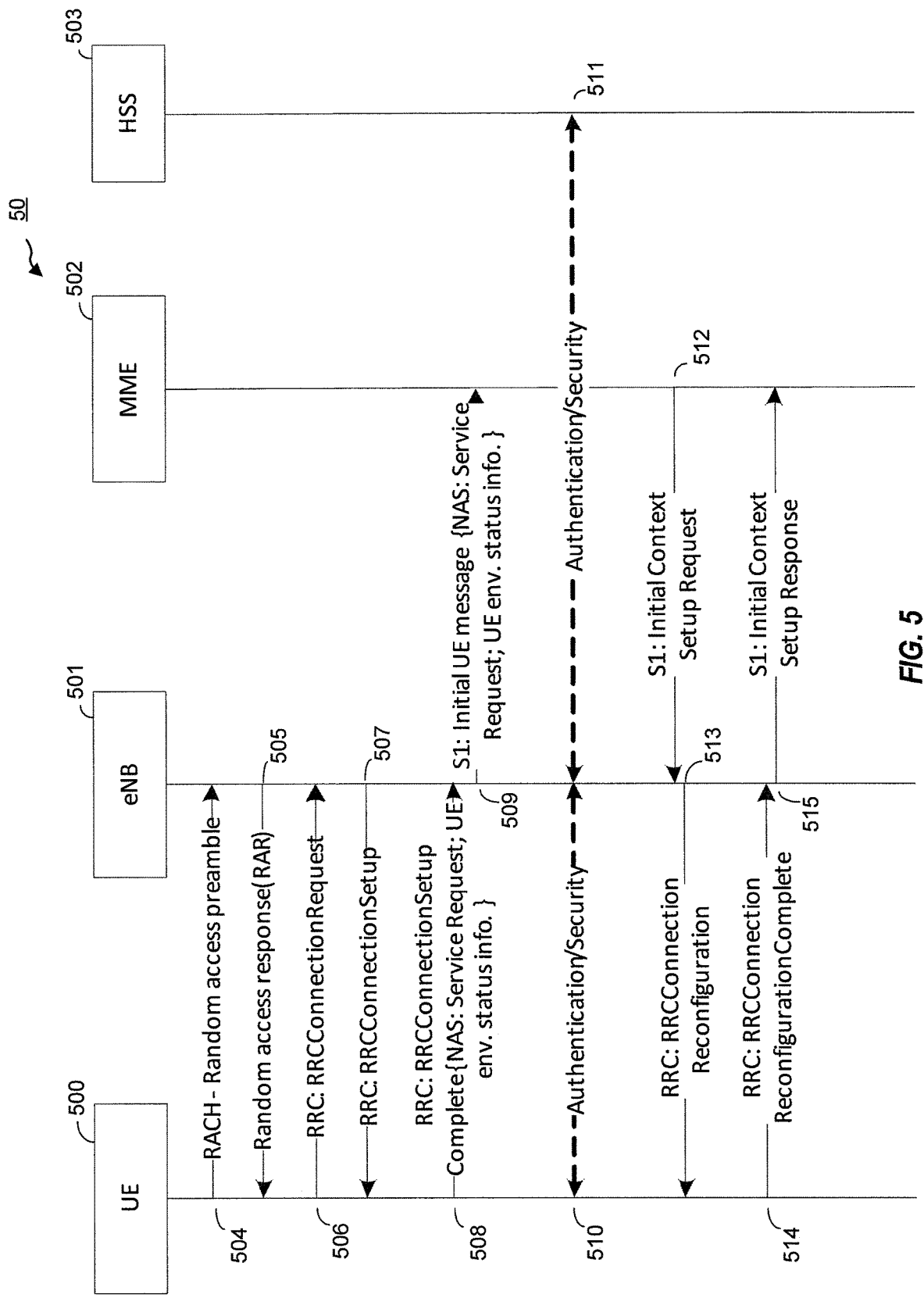
FIG. 5 is a call flow diagram illustrating an example call flow configured according to one aspect of the present disclosure for communication between a UE, an eNB, and an MME.

FIG. 5 is a call flow diagram 50 illustrating an example call flow configured according to one aspect of the present disclosure for communication between a UE 500, an eNB 501, and an MME 502. At time 504, UE 500 initiates an RRC Connection Establishment procedure and sends a random access preamble on the random access channel (RACH). eNB 502 responds, at time 505, with the random access response (RAR) on the downlink shared channel (DL-SCH). The RAR is addressed to the random access radio network temporary identifier (RA-RNTI) on the physical downlink control channel (PDCCH) and includes timing alignment information, an initial uplink (UL) grant and an assignment of a temporary cell RNTI (C-RNTI). At time 506, UE 500 sends the RRC connection request message including the NAS identity. ENB 501 responds, at time 507, with an RRC connection setup message. UE 500 then sends the RRC connection setup complete message, at time 508, along with the initial NAS message service request towards MME 502. This initial NAS message is encapsulated in the RRC message and includes the UE environmental status information.

At time 509, eNB 501 forwards the service request to MME 502. The NAS message is encapsulated in an S1 application protocol (S1-AP) initial UE message that includes the UE environmental status information. MME 602 and UE 500 may optionally perform, at optional times 510 and 511, the NAS authentication/security procedures with home subscriber server (HSS) 503. At time 512, MME 502 sends the S1-AP initial context setup request message to eNB 501 to activate the radio and S1 bearers for all the active EPS bearers. ENB 501 stores the initial context setup information in the UE RAN context.

It should be noted that if the context is included in the actual NAS message (instead of being sent along with the NAS message as a new information element (IE) in the initial UE message, MME 502 may send the context back to eNB 501. Alternatively, MME 502 may indicate the behavior of the RAN with respect to the context in the subscriber profile ID IE in the S1-AP initial context setup request, at time 512. This subscriber profile ID for RAT/frequency selection priority is used to define camp priorities in Idle mode and to control inter-RAT/inter-frequency handover in Active mode.

At 513, eNB 501 sends the RRC connection reconfiguration message to UE 500 to establish the radio bearers and the user plane security. UE 500 then sends the RRC connection reconfiguration complete message to eNB 501 in acknowledgement, at 514. At 515, eNB 501 sends the S1-AP initial context setup complete message to MME 502. Thus, UE 500 informs the core network of its UE environmental status information through the NAS communication with MME 502. MME 502 may then use this additional status information to intelligently make paging and registration decisions as well as to activate or de-active data offloading processes.

Figure 6:
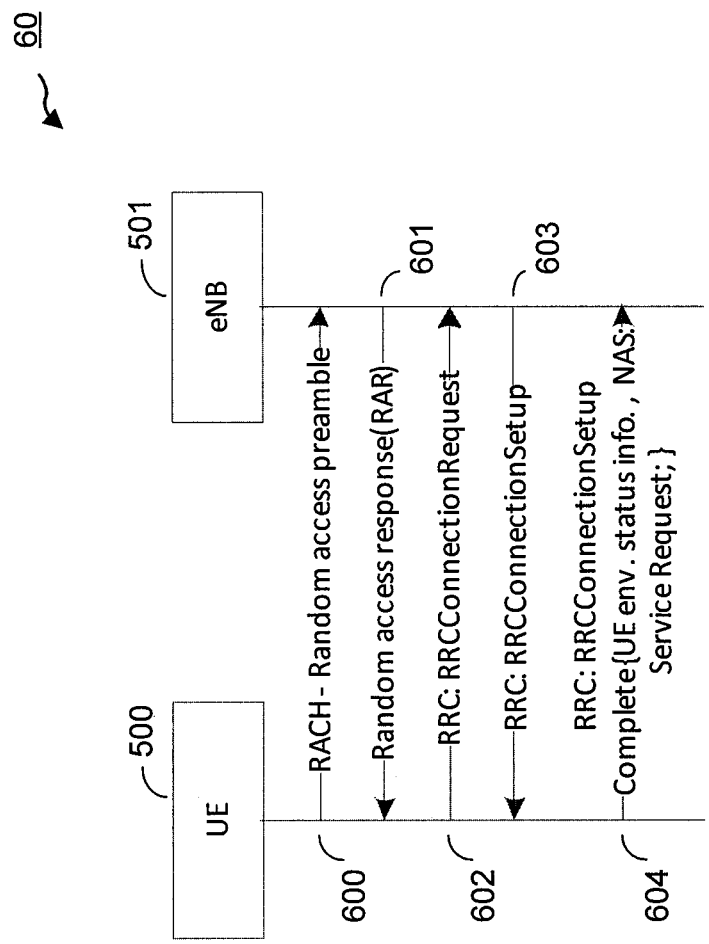
FIG. 6 is a call flow diagram illustrating an example call flow configured according to one aspect of the present disclosure for communication between a UE and an eNB.

FIG. 6 is a call flow diagram 60 illustrating an example call flow configured according to one aspect of the present disclosure for communication between a UE 500 and an eNB 501. At 600, UE 500 initiates the RRC connection establishment procedure and sends a random access preamble on the RACH. ENB 501 responds, at time 601, with the RAR on the DL-SCH. As before, the RAR is addressed to RA-RNTI on the PDCCH and includes timing alignment information, an initial UL grant and an assignment of a Temporary C-RNTI.

At 602, UE 500 sends the RRC connection request message including the NAS identity to eNB 501. eNB 501 responds, at 603, with an RRC connection setup message. UE 500 sends the RRC connection setup complete message, at 604, along with the initial NAS service request message towards the MME (not shown) encapsulated in the RRC message. The RRC connection setup complete message includes the UE environmental status information. Thus, eNB 501 may use the UE environmental status information to make handover decisions or offloading decisions.

It should be noted that, in additional or alternative aspects of the present disclosure, the UE environmental status information may be included in the RRC connection request message at time 602. The various aspects of the present disclosure are not limited to a single time period or message with which to transmit the UE environmental status information.

It should further be noted that in further aspects of the present disclosure, eNB 501 may forward the UE environmental status information to MME 502 (FIG. 5) in a new S1-AP message. Similarly, eNB 500 may forward the UE environmental status information to a target eNB (not shown) for handover as part of the UE environmental status information already forwarded.

FIG. 7 is a diagram illustrating example blocks executed to implement one aspect of the present disclosure. At block 700, UE environmental status information is determined by a UE based on input from at least one non-RF sensor located in the UE. The UE environmental status information may include an estimate or other indication of the duration over which the status should be valid for connection management. A control message is generated, at block 701, comprising the UE environmental status information. The control message is transmitted, at block 702, to a base station in communication with the UE, wherein the control message relates to managing a connection with the UE.

FIG. 8 is a diagram illustrating example blocks executed to implement one aspect of the present disclosure. At block 800, a control message is received by a base station from an associated UE, where the control message comprises UE environmental status information based on input from at least one non-RF sensor located in the associated UE. The base station manages a connection of the associated UE, at block 801, based at least in part on the UE environmental status information.

Figure 9:
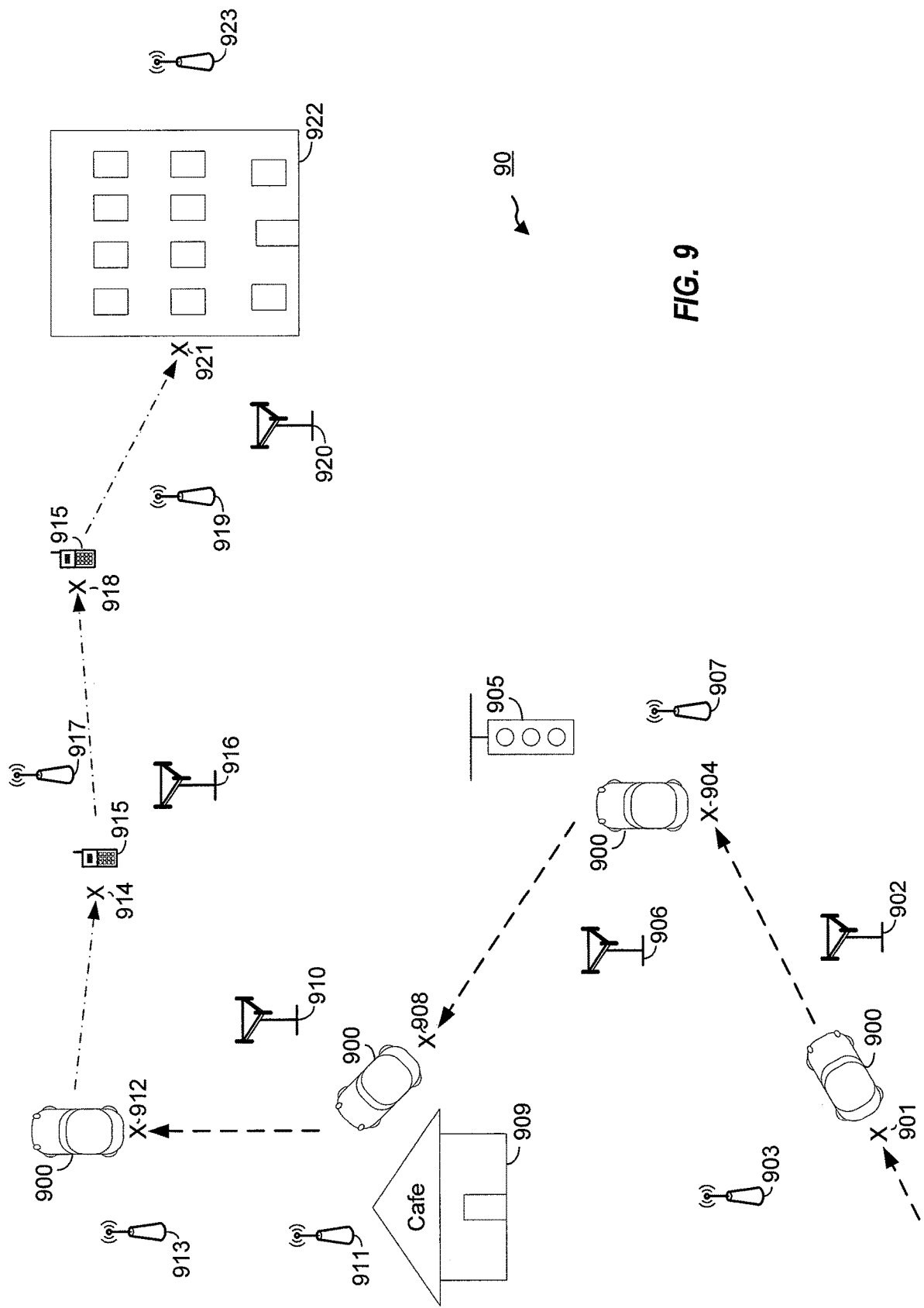
FIG. 9 is a diagram illustrating wireless communication network configured according to one aspect of the present disclosure.

FIG. 9 is a diagram illustrating wireless communication network 90 configured according to one aspect of the present disclosure. A user carrying UE 915 is driving in vehicle 900. At time 901, vehicle 900 is entering the coverage area of macro base station 902. Using the non-RF sensors of UE 915, the environmental status information is determined. For example, the camera (not shown) of UE 915 is activated to capture an image which is analyzed for feature recognition. The image captured indicates that UE 915 is facing the interior roof of an automobile. Additional sensor information from the GPS receiver (not shown) of UE 915 indicates that UE 915 is moving at approximately 85 miles per hour (mph). UE 915 then accesses application data from the calendar application of UE 915. The calendar application indicates a meeting entry for the current day located about 60 miles from vehicle 900's current position. Based on this non-RF sensor data, UE 915 selects one of the available environmental statuses. UE selects the "in vehicle" status as the data would indicate that UE 915 will be traveling for at least 40 minutes to an hour to the appointment location.

As a part of its connection establishment with macro base station 902, UE 915 transmits the UE environmental status information to macro base station 902. Considering that the UE environmental status information indicates that UE 915 is traveling, macro base station 902 determines that UE 915 is not a good candidate for handover or data offloading to femto access point 902. Moreover, based on the "in vehicle" status, macro base station 902 determines that UE 915 is suited to stay in the macro layer of wireless communication network 90.

At time 904, vehicle 900 stops at traffic signal 905. Having traveled out of macro base station 902's coverage area, UE 915 has been handed over to macro base station 906. UE 915 determines that a lifespan timer has not expired with regard to the "in vehicle" status calculated at time 901. Accordingly, UE 915 does not re-calculate a new status, but transmits the existing UE environmental status information to macro base station 906. As a part of it connection with UE 915, macro base station 906 measure the Doppler of the signals from UE 915. While stopped at traffic signal 905, the Doppler indicates to macro base station 906 that UE 915 would be an ideal candidate for data offloading to femto access point 907. However, with the UE environmental status information for UE 915 indicating "in vehicle," macro base station 906 knows that UE 915 should not be transferred to the small cell layer of wireless communication network 90.

Just prior to time 908, UE 915 leaves the coverage area of macro base station 906 and begins entering the coverage area of macro base station 910. As the timer for the current UE environmental status information has expired, UE 915 again calculates its current status using readings and data. The data and non-RF sensor readings indicate again that UE 915 is "in vehicle." UE 915, thus, transmits this UE environmental status information to macro base station 910 as a part of the connection establishment. Just after reporting the UE environmental status information, vehicle 900 stops at time 908. The user exits the vehicle with UE 915 and enters café 909. UE 915 detects the change in environmental status by analyzing new image data from the camera sensor, new temperature data from the thermometer sensor, and new location data from the GPS receiver sensor, along data from mapping and dining applications which indicate an establishment where a user might spend some time. Based on this non-RF sensor information and application data, UE 915 selects a new status of "indoors stationary" from the list of available statuses.

In addition to the timer which keeps track of the useful life span of UE environmental status information, another timer maintains a delay or hysteresis in reporting of changes in the status. With UE 915 having just reported the updated UE environmental status information when being handed over to macro base station 910, the minimum threshold of time has not yet passed when UE 915 may send another status update. UE 915 cannot immediately send the new status update to macro base station 910. Macro base station 910, therefore, maintains UE 915 within the macro layer of wireless communication network 90. However, when the threshold timer expires and UE 915 remains within café 909, UE 915 transmits an update to its UE environmental status information. UE 915 may accomplish this update reporting through a tracking area update (TAU)/routing area update (RAU)/location area update (LAU) or the like. However, upon receipt of the new UE environmental status information, macro base station 910 determines to offload the data traffic of UE 915 to femto access point 911.

As the user finishes at café 909, the travel continues in vehicle 900. As the lifespan timer has expired, UE 915 again calculates its environmental status using the non-RF sensors and application data to select the "in vehicle" status. This status update is transmitted to macro base station 910, which hands UE 915 back over to the macro layer of wireless communication network 90. At time 912, vehicle 900 stops and the user exits again with UE 915. After the threshold timer expires, UE 915 detects that it is outside and moving at a rate comparable to walking. Based on this non-RF sensor information, UE 915 selects the status of "outdoors pedestrian" from the list of available statuses. As an additional part of the UE environmental status information, UE 915 includes it current state, which is out of its holster with the screen active and receiving a large amount of data.

At time 914, as UE 915 is now entering the coverage area of macro base station 916, when handing over from macro base station 910, UE 915 reports the new UE environmental status information to macro base station 916. The cell covered by macro base station 916 is configured to support a multi-flow connection. Accordingly, based on the UE environmental status information, macro base station 916 determines to offload the data traffic for UE 915 to femto access point 917 while still maintaining a connection with UE 915.

At time 918, the lifespan timer of UE 915 has again expired, thus, prompting UE 915 to re-calculate the UE environmental status information. The non-RF sensors and application data indicate that the environmental status of UE 915 remains "outdoors pedestrian." Upon report of this update to macro base station 916, macro base station 916 determines to maintain UE 915 in the multi-flow connection. As UE 915 begins entering the coverage area of macro base station 920, macro base station 916 transmits the current UE environmental status information to macro base station 920 directly. Macro base station 920 continues to hold UE 915 in a multi-flow connection by handing over the data traffic from femto access point 917 to femto access point 919 while maintaining its own connection to UE 915.

At time 921, the user enters into office building 922. UE 915 detects a change in its status using the non-RF sensor data from its camera, thermometer, microphone, and GPS receiver, along with application data from the map application, calendar application, and contacts application. Based on this non-RF sensor data and application information, UE 915 selects a new environmental status of "inside stationary" from the list of available statuses. When the timing provides, UE 915 updates its UE environmental status information with macro base station 920. Based on the information that UE 915 has low mobility with a status of "inside stationary," macro base station 920 determines that it would be most efficient to handover UE 915 to femto access point 923. Similarly, with the "inside stationary" status, the mobility entity of wireless communications network 90, which may be an MME or, a serving general packet radio service (GPRS) service node (SGSN) in pre-LTE networks, assigns a tracking area that encompasses the coverage area of femto access point 923. Accordingly, based on the UE environmental status information, wireless communications network 90 is able to efficiently manage the mobility and data offloading decisions of a UE across its network.

Turning back to FIG. 3, controller/processor 280 executes the various software and firmware that provides the features of UE 30 and controls the various components in order to implement such features. When calculating or determining UE 30's environmental status information, controller/processor 280 controls the operation of sensors 306, which are non-RF sensors, to obtain the data or information being sensed. Controller/processor 280 analyzes the sensor data and accesses environmental status list 308 in memory 282. The combination of these components and acts provides means for determining, by a UE, UE environmental status information based on input from at least one non-RF sensor located in the UE.

Controller/processor 280 uses the selected status from environmental status list 308 stored in memory 282 to generate a control message that comprises the selected status. The combination of these components and acts provides means for generating a control message comprising the UE environmental status information.

Once the control message comprising the environmental status is generated, the control message may be transmitted to a base station using either the WWAN radios 300 or the WLAN radios 301, under control of controller/processor 280, depending on how UE 30 is currently connected to the network. The combination of these components and acts provides means for transmitting the control message to a base station in communication with the UE, wherein the control message relates to managing a connection with the UE by an associated wireless communication network.

Figure 10:
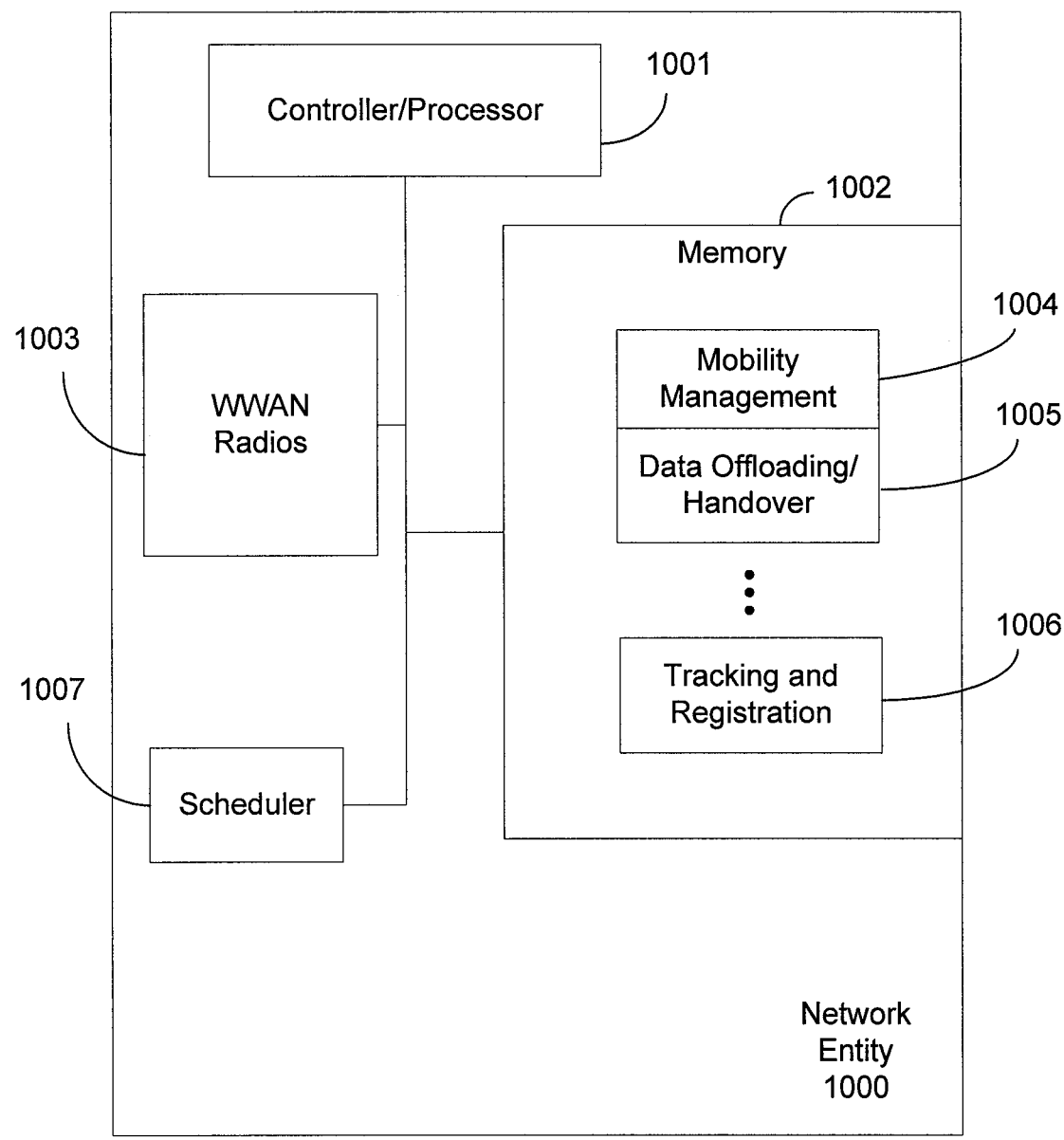
FIG. 10 is a block diagram illustrating a network entity configured according to one aspect of the present disclosure.

Turning now to FIG. 10, a network entity 1000 is illustrated configured according to one aspect of the present disclosure. Network entity 1000 may be a base station, an MME, a SGSN, or the like. Network entity 1000 is configured with controller/processor 1001, which executes the software and firmware to implement the features of network entity 1000 as well as control the components of network entity 1000. Network entity 1000 further includes memory 1002 which stores various application and logic which, when executed by controller/processor 1001, provides the functionality of network entity 1000. When a UE is establishing communication or providing an updated environmental status, signals are received through WWAN radios 1003, under control of controller/processor 1001. The combination of these components and acts provides means for receiving a control message from an associated UE, wherein the control message comprises UE environmental status information based on input from at least one non-RF sensor located in an associated UE.

Controller/processor accesses memory 1002 to executed mobility management application 1004. When executed, the mobility management feature uses the UE environmental status information received to make decisions with regard to managing the connection of the associated UE. When network entity 1000 comprises a base station, it may operate data traffic offloading and make handover decisions on execution of data offloading/handover application 1005. Data offloading/handover application 1005, when executed by controller/processor 1001, analyzes the measurement data received from the associated UE and supplements the decision making with the UE environmental status information received from the associated UE. Using this information, network entity 1000 may make handover and data offloading decisions with regard to the associated UE.

When network entity 1000 comprises a MME or SGSN, controller/processor 1001 may also access memory 1002 to execute tracking and registration application 1006. Tracking and registration application 1006 may use the UE environmental status information to determine an appropriate tracking area and registration frequency for the associated UE. In such an aspect, the network entity 1000 may also execute data offloading/handover application 1005 to enable or disable data offloading processes, such as LIPA and SIPTO.

The network entity 1000 in either aspect as a base station or higher network entity such as an MME or SGSN, will use scheduler 1007 to schedule connection management signals and transmit the signals to the associate UE using WWAN radios 1003 for management of the connection. The combination of these components and acts provides means for managing a connection of the associated UE based at least in part on the UE environmental status information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE), UE environmental status information based on input from at least one non-radio frequency (RF) sensor located in the UE;
   generating a control message comprising the UE environmental status information, wherein the control message comprises a location area update directed to a network entity of a wireless communication network;
   transmitting the control message to a base station in communication with the UE via a connection with the UE, wherein the UE environmental status information relates to managing the connection with the UE by an associated wireless communication network, wherein the transmitting is performed in response to detecting a change in the UE environmental status information; and
   receiving, in response to the control message, an instruction for managing the connection, wherein the instruction is based at least in part on the UE environmental status information.

2. The method of claim 1, wherein the control message comprises a radio resource control (RRC) message, the control message comprises a non-access stratum (NAS) message encapsulated in the RRC message, and the NAS message comprises the location area update directed to the network entity of the wireless communication network, and wherein the NAS message further comprises at least one of attach, tracking area update, or routing area update.

3. The method of claim 2, wherein the network entity comprises one of:
   a mobility management entity (MME); and
   a serving general packet radio service (GPRS) service node (SGSN).

4. The method of claim 1, wherein the UE environmental status information relates to a mobility level of the UE.

5. The method of claim 4, wherein the UE environmental status information comprises an estimated duration for the mobility level.

6. The method of claim 1, wherein the at least one non-RF sensor is selected from the group comprising:
   an accelerometer;
   a gyroscope;
   a global positioning system (GPS) receiver;
   a thermometer;
   a camera;
   a microphone;
   an altimeter;
   a heart rate monitor;

a humidity detector;
a photodetector;
a charging indicator; and
a barometer.

7. The method of claim 1, further comprising:
delaying the transmitting when the change is detected within a predetermined time period from transmitting a previous control message.

8. The method of claim 1, further comprising:
determining, by the UE, application information available from at least one user application operable on the UE, wherein the UE environmental status information is further determined based, at least in part, on the application information.

9. The method of claim 1, wherein the determining the UE environmental status information comprises:
selecting the UE environmental status information from a predetermined set of UE environmental statuses, wherein the selecting is based on input from the at least one non-RF sensor.

10. The method of claim 9, wherein the predetermined set of UE environmental statuses comprises:
in transit status;
in vehicle status;
outdoors status; and
indoors status.

11. The method of claim 10, wherein the predetermined set of UE environmental statuses further comprises at least one of:
at work status;
at home status;
amount of data traffic; and
UE state.

12. The method of claim 1, further comprising:
maintaining the connection with the wireless communication network when the connection is managed based at least in part of the UE environmental status information.

13. The method of claim 12, wherein receiving the instruction includes one of:
receiving a handover instruction based at least in part on the UE environmental status information from the base station to hand over to a second base station;
receiving instructions based at least in part on the UE environmental status information from the base station to offload data traffic to the second base station while maintaining connection with the base station;
receiving a paging area parameter from the base station defining a paging area for the UE based at least in part on the UE environmental status information;
receiving registration timing from the base station based at least in part on the UE environmental status information, wherein the registration timing defines a frequency at which the UE registers with an associated network; and
receiving a parameter for discontinuous reception from the base station based at least in part on the UE environmental status information.

14. The method of claim 13, wherein the second base station comprises one of: a wireless local area network (WLAN) base station, a small cell base station, or a combination thereof.

15. The method of claim 1, wherein the associated wireless communication network is configured to respond to the UE environmental status information by:

establishing a UE-specific handover preference between a small cell layer and a macro layer in a heterogeneous environment;
activating booster cells for Wi-Fi offloading;
controlling simultaneous communication with the macro layer and the small cell layer using multi-flow techniques; or
combinations thereof.

16. The method of claim 1, wherein the transmitting is also performed in response to an expiration of a timer associated with the UE environmental status information, wherein the timer is a lifespan timer associated with the UE environmental status information, and wherein, when the lifespan timer expires without the UE detecting the change in the UE environmental status information, a new UE environmental status information is determined by taking new readings in response to expiration of the lifespan timer.

17. The method of claim 1, wherein transmitting the control message is performed further in response to one or more of:
expiration of a timer associated with the UE environmental status information, or
connection establishment to register by the associated UE to the network entity.

18. The method of claim 1, wherein the control message comprises a non-access stratum (NAS) message encapsulated in a radio resource control (RRC) message, and the NAS message comprises the location area update.

19. A method of wireless communication, comprising:
receiving, by a network entity of a wireless communication network via a connection of an associated user equipment (UE), a control message from the associated UE, wherein the control message comprises UE environmental status information based on input from at least one non-radio frequency (RF) sensor located in the associated UE, wherein the control message comprises a location area update directed to a network entity of a wireless communication network, wherein the receiving is in response to an update to the UE environmental status information by the associated UE;
managing the connection of the associated UE with the wireless communication network based at least in part on the UE environmental status information; and
transmitting, to the UE in response to the control message, an instruction for managing the connection, wherein the instruction is based at least in part on the UE environmental status information.

20. The method of claim 19, further comprising:
determining a network policy applicable to the connection based at least in part on the UE environmental status information.

21. The method of claim 19, wherein managing the connection comprises one or more of:
determining whether to offload data traffic of the associated UE from the network entity to a first base station;
determining whether to maintain connection with the associated UE when the associated UE is within a coverage area of the first base station;
determining whether to handover the associated UE to the first base station;
determining whether to maintain connection with the associated UE and direct the associated UE to transmit data traffic through the first base station;
determining a paging area for the associated UE;
determining how often to require the associated UE to register for paging; and determining a discontinuous reception setting for the associated UE, wherein the method further comprises:
transmitting a connection management signal to the associated UE in response to the determining.

22. The method of claim 21, wherein the first base station comprises one of: a wireless local area network (WLAN) base station, a small cell base station, or a combination thereof.

23. The method of claim 19, wherein the UE environmental status information comprises:
in transit status;
in vehicle status;
outdoors status; and
indoors status.

24. The method of claim 23, wherein the UE environmental status information additionally comprises one or more of:
at work status;
at home status;
amount of data traffic; and
UE state.

25. The method of claim 19, wherein the network entity comprises one of:
a base station;
a mobility management entity (MME); and
a serving general packet radio service (GPRS) service node (SGSN).

26. The method of claim 25, wherein the network entity comprises a second base station, the method further comprising:
transmitting the UE environmental status information to one of: the MME and the SGSN, associated with the second base station.

27. The method of claim 25, wherein the network entity comprises one of: the MME and the SGSN, the method further comprising:
transmitting the UE environmental status information to a second base station associated with the associated UE.

28. The method of claim 19, wherein the UE environmental status information is additionally based on application information available from at least one user application of the UE.

29. The method of claim 19, wherein the UE environmental status information relates to a mobility level of the UE, and wherein the UE environmental status information comprises an estimated duration for the mobility level.

30. The method of claim 19, wherein managing the connection of the associated UE includes responding to the UE environmental status information by:
establishing a UE-specific handover preference between a small cell layer and a macro layer in a heterogeneous environment;
activating booster cells for Wi-Fi offloading;
controlling simultaneous communication with the macro layer and the small cell layer using multi-flow techniques; or
combinations thereof.

31. The method of claim 19, wherein receiving the control message is performed further in response to one or more of:
expiration of a timer associated with the UE environmental status information, or
connection establishment to register by the associated UE to the network entity.

32. The method of claim 19, wherein the control message comprises a non-access stratum (NAS) message encapsulated in a radio resource control (RRC) message, and the NAS message comprises the location area update.

33. An apparatus configured for wireless communication, the apparatus comprising:
at least one processor; and
a memory coupled to the at least one processor,
wherein the at least one processor is configured:
to determine, by a user equipment (UE), UE environmental status information based on input from at least one non-radio frequency (RF) sensor located in the UE;
to generate a control message comprising the UE environmental status information, wherein the control message a location area update directed to a network entity of a wireless communication network;
to transmit the control message to a first base station in communication with the UE via a connection with the UE, wherein the UE environmental status information relates to managing the connection with the UE by an associated wireless communication network, wherein the configuration of the at least one processor to transmit is performed in response to detecting a change in the UE environmental status information; and
to receive, in response to the control message, an instruction for managing the connection, wherein the instruction is based at least in part on the UE environmental status information.

34. The apparatus of claim 33, wherein the control message comprises a radio resource control (RRC) message, the control message comprises a non-access stratum (NAS) message encapsulated in the RRC message, and the NAS message comprises the location area update directed to the network entity of the wireless communication network, and wherein the NAS message further comprises at least one of attach, tracking area update, or routing area update.

35. The apparatus of claim 34, wherein the network entity comprises one of:
a mobility management entity (MME); and
a serving general packet radio service (GPRS) service node (SGSN).

36. The apparatus of claim 33, wherein the UE environmental status information relates to a mobility level of the UE.

37. The apparatus of claim 36, wherein the UE environmental status information comprises an estimated duration for the mobility level.

38. The apparatus of claim 33, wherein the at least one non-RF sensor is selected from the group comprising:
an accelerometer;
a gyroscope;
a global positioning system (GPS) receiver;
a thermometer;
a camera;
a microphone;
an altimeter;
a heart rate monitor;
a humidity detector;
a photodetector;
a charging indicator; and
a barometer.

39. The apparatus of claim 33, wherein the at least one processor is further configured:
to delay the configuration to transmit when the change is detected within a predetermined time period from transmitting a previous control message.

40. The apparatus of claim 33, wherein the at least one processor is further configured:

to determine, by the UE, application information available from at least one user application operable on the UE, wherein the UE environmental status information is further determined based, at least in part, on the application information.

41. The apparatus of claim 33, wherein the configuration of the at least one processor to determine the UE environmental status information comprises configuration:
to select the UE environmental status information from a predetermined set of UE environmental statuses, wherein the selection is based on input from the at least one non-RF sensor.

42. The apparatus of claim 41, wherein the predetermined set of UE environmental statuses comprises:
in transit status;
in vehicle status;
outdoors status; and
indoors status.

43. The apparatus of claim 42, wherein the predetermined set of UE environmental statuses further comprises at least one of:
at work status;
at home status;
amount of data traffic; and
UE state.

44. The apparatus of claim 33, wherein the at least one processor is further configured:
to maintain the connection when the connection is managed by the wireless communication network based at least in part of the UE environmental status information.

45. The apparatus of claim 44 wherein the at least one processor is configured to receive the instruction by being configured to one of:
receive a handover instruction based at least in part on the UE environmental status information from the first base station to hand over to a second base station;
receive instructions based at least in part on the UE environmental status information from the first base station to offload data traffic to the second base station while maintaining connection with the first base station;
receive a paging area parameter from the first base station defining a paging area for the UE based at least in part on the UE environmental status information;
receive registration timing from the first base station based at least in part on the UE environmental status information, wherein the registration timing defines a frequency at which the UE registers with an associated network; and
receive a parameter for discontinuous reception from the first base station based at least in part on the UE environmental status information.

46. The apparatus of claim 45, wherein the second base station comprises one of: a wireless local area network (WLAN) base station, a small cell base station, or a combination thereof.

47. An apparatus configured for wireless communication, the apparatus comprising:
at least one processor; and
a memory coupled to the at least one processor, wherein the at least one processor is configured:
to receive, by a network entity of a wireless communication network via a connection of an associated user equipment (UE), a control message from the associated UE, wherein the control message comprises UE environmental status information based on input from at least one non-radio frequency (RF) sensor located in the associated UE, wherein the control message comprises a location area update directed to a network entity of a wireless communication network, wherein the configuration of the at least one processor to receive is in response to an update to the UE environmental status information by the associated UE;
to manage the connection of the associated UE with the wireless communication network based at least in part on the UE environmental status information; and
to transmit, to the UE in response to the control message, an instruction for managing the connection, wherein the instruction is based at least in part on the UE environmental status information.

48. The apparatus of claim 47, wherein the at least one processor is further configured:
to determine a network policy applicable to the connection based at least in part on the UE environmental status information.

49. The apparatus of claim 47, wherein configuration of the at least one processor to manage the connection comprises configuration to one or more of:
determine whether to offload data traffic of the associated UE from the network entity to a second base station;
determine whether to maintain connection with the associated UE when the associated UE is within a coverage area of the second base station;
determine whether to handover the associated UE to the second base station;
determine whether to maintain connection with the associated UE and direct the associated UE to transmit data traffic through the second base station;
determine a paging area for the associated UE;
determine how often to require the associated UE to register for paging; and
determine a discontinuous reception setting for the associate UE, wherein the at least one processor is further configured:
transmit a connection management signal to the associated UE in response to the determination.

50. The apparatus of claim 49, wherein the second base station comprises one of: a wireless local area network (WLAN) base station, a small cell base station, or a combination thereof.

51. The apparatus of claim 47, wherein the UE environmental status information comprises:
in transit status;
in vehicle status;
outdoors status; and
indoors status.

52. The apparatus of claim 51, wherein the UE environmental status information additionally comprises one or more of:
at work status;
at home status;
amount of data traffic; and
UE state.

53. The apparatus of claim 47, wherein the network entity comprises one of:
a base station;
a mobility management entity (MME); and
a serving general packet radio service (GPRS) service node (SGSN).

54. The apparatus of claim 53, wherein the network entity comprises a first base station the at least one processor further configured:

to transmit the UE environmental status information to one of: the MME and the SGSN, associated with the first base station.

55. The apparatus of claim 35, wherein the network entity comprises one of: the MME and the SGSN, and the at least one processor is further configured:
to transmit the UE environmental status information to the base station associated with the associated UE.

56. The apparatus of claim 47, wherein the UE environmental status information is additionally based on application information available from at least one user application of the UE.

57. The apparatus of claim 47, wherein the UE environmental status information relates to a mobility level of the UE, and wherein the UE environmental status information comprises an estimated duration of the mobility level.

58. A method of wireless communication, comprising:
compiling user equipment (UE) environmental status information based on input from one or more of: at least one sensor located in the UE and separate from a receiver used for radio communication with a serving base station, and at least one user application stored in a memory and executable by a processor of the UE;
generating a control message that includes the UE environmental status information, wherein the control message comprises location area update directed to a network entity of a wireless communication network;
transmitting the control message to the serving base station via a connection between the UE and the serving base station, wherein the UE environmental status information enables management of the connection with the UE by an associated wireless communication network, wherein the transmitting is performed in response to detecting a change in the UE environmental status information; and
receiving, in response to the control message, an instruction for managing the connection, wherein the instruction is based at least in part on the UE environmental status information.

59. The method of claim 58, wherein the associated wireless communication network is configured to respond to the UE environmental status information by:
establishing a UE-specific handover preference between a small cell layer and a macro layer in a heterogeneous environment;
activating booster cells for Wi-Fi offloading;
controlling simultaneous communication with the macro layer and the small cell layer using multi-flow techniques; or
combinations thereof.

60. A method of wireless communication, comprising:
determining, by a user equipment (UE), UE environmental status information based on input from at least one non-radio frequency (RF) sensor located in the UE, wherein the UE environmental status information comprises an estimated duration for a mobility level of the UE;
generating a control message comprising the UE environmental status information, wherein the control message comprises a location area update directed to a network entity of a wireless communication network;
transmitting the control message to a base station in communication with the UE via a connection with the UE, wherein the UE environmental status information relates to managing the connection with the UE by an associated wireless communication network, wherein the transmitting is performed in response to one or more of:
expiration of a timer associated with the UE environmental status information,
connection establishment to register by the UE to the base station, and
detecting a change in the UE environmental status information; and
receiving, in response to the control message, an instruction for managing the connection, wherein the instruction is based at least in part on the UE environmental status information.

61. The method of claim 60, wherein transmitting the control message is performed in response to detecting the change in the UE environmental status information, and wherein the control message comprises a radio resource control (RRC) message, the control message comprises a non-access stratum (NAS) message encapsulated in the RRC message, and the NAS message comprises the location area update directed to the network entity of the wireless communication network.

62. The method of claim 60, wherein the control message comprises a non-access stratum (NAS) message encapsulated in a radio resource control (RRC) message, and the NAS message comprises the location area update.

63. An apparatus configured for wireless communication, the apparatus comprising:
at least one processor; and
a memory coupled to the at least one processor,
wherein the at least one processor is configured:
to determine, by a user equipment (UE), UE environmental status information based on input from at least one non-radio frequency (RF) sensor located in the UE, wherein the UE environmental status information comprises an estimated duration for a mobility level of the UE;
to generate a control message comprising the UE environmental status information, wherein the control message comprises a location area update directed to a network entity of a wireless communication network;
to transmit the control message to a first base station in communication with the UE via a connection with the UE, wherein the UE environmental status information relates to managing the connection with the UE by an associated wireless communication network, wherein the configuration of the at least one processor to transmit is performed in response to one or more of:
expiration of a timer associated with the UE environmental status information,
connection establishment to register by the UE to the first base station, and
detecting a change in the UE environmental status information; and
to receive, in response to the control message, an instruction for managing the connection, wherein the instruction is based at least in part on the UE environmental status information.

64. A method of wireless communication, comprising:
receiving, by a network entity of a wireless communication network via a connection of an associated user equipment (UE), a control message from the associated UE, wherein the control message comprises UE environmental status information based on input from at least one non-radio frequency (RF) sensor located in the associated UE, wherein the UE environmental status information comprises an estimated duration for a mobility level of the associated UE, wherein the control message comprises a location area update directed to a network entity of a wireless communication network, wherein the receiving is in response to one or more of:
- expiration of a timer associated with the UE environmental status information,
- connection establishment to register by the associated UE to the network entity, and
- an update to the UE environmental status information by the associated UE;

managing the connection of the associated UE with the wireless communication network based at least in part on the UE environmental status information; and transmitting, to the UE in response to the control message, an instruction for managing the connection, wherein the instruction is based at least in part on the UE environmental status information.

65. The method of claim 64, wherein receiving the control message is in response to the update to the UE environmental status information by the associated UE, and wherein the control message comprises a radio resource control (RRC) message, the control message comprises a non-access stratum (NAS) message encapsulated in the RRC message, and the NAS message comprises the location area update directed to the network entity of the wireless communication network.

66. An apparatus configured for wireless communication, the apparatus comprising:
at least one processor; and
a memory coupled to the at least one processor,
wherein the at least one processor is configured:
to receive, by a network entity of a wireless communication network via a connection of an associated user equipment (UE), a control message from the associated UE, wherein the control message comprises UE environmental status information based on input from at least one non-radio frequency (RF) sensor located in the associated UE, wherein the UE environmental status information comprises an estimated duration for a mobility level of the associated UE, wherein the control message comprises a location area update directed to a network entity of a wireless communication network, wherein the configuration of the at least one processor to receive is in response to one or more of:
- expiration of a timer associated with the UE environmental status information,
- connection establishment to register by the associated UE to the network entity, and
- an update to the UE environmental status information by the associated UE;

to manage the connection of the associated UE with the wireless communication network based at least in part on the UE environmental status information; and to transmit, to the UE in response to the control message, an instruction for managing the connection, wherein the instruction is based at least in part on the UE environmental status information.

\* \* \* \* \*